United States Patent
Bailliu et al.

(10) Patent No.: US 9,939,052 B2
(45) Date of Patent: Apr. 10, 2018

(54) TENSION ROLLER ASSEMBLY FOR A BELT DRIVE

(71) Applicant: CNH Industrial America LLC, New Holland, PA (US)

(72) Inventors: Stijn Bailliu, Ichtegem (BE); Frank Duquesne, Zwevegem (BE); Tom Somers, Aalter (BE); Charlotte Van de Wege, Zulte (BE); Ruben Vancoillie, Roeselare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/245,816

(22) Filed: Aug. 24, 2016

(65) Prior Publication Data
US 2017/0059014 A1    Mar. 2, 2017

(30) Foreign Application Priority Data

Aug. 24, 2015 (BE) .................................. 2015/5525

(51) Int. Cl.
*F16H 7/14* (2006.01)
*F16H 7/22* (2006.01)
(Continued)

(52) U.S. Cl.
CPC ............. *F16H 7/129* (2013.01); *A01D 69/06* (2013.01); *A01F 12/56* (2013.01); *F16H 7/08* (2013.01);
(Continued)

(58) Field of Classification Search
CPC ........... F16H 7/0827; F16H 2007/0893; F16H 7/1281; F16H 2007/0806; F16H 2007/088
(Continued)

(56) References Cited

U.S. PATENT DOCUMENTS 140,299 A * 6/1873 Bryan ....................... F16H 7/22
                                                474/128
367,891 A * 8/1887 Canning ............... F16H 7/0827
                                                474/119
(Continued)

FOREIGN PATENT DOCUMENTS

EP      0036198 A1    9/1981
EP      1607657 A2   12/2005
(Continued)

OTHER PUBLICATIONS

EP16185510, Extended European Search Report, dated Jan. 23, 2017, 5 pages.

*Primary Examiner* — Henry Y Liu
(74) *Attorney, Agent, or Firm* — Peter K. Zacharias

(57) ABSTRACT

A tension roller assembly includes a tension roller, a pivotable support arm, a tension arm, a compression spring, a rod, first and second spring stops, a mounting plate, and an overcenter assembly connected to an end of the tension arm. The overcenter assembly connects the tension arm to the mounting plate. The overcenter assembly is configured to make a pivoting movement over a pivot trajectory between engaged and disengaged positions. The overcenter assembly further has a center position located between the engaged and disengaged positions. The pivot trajectory between the center position and the disengaged position is divided into a tensioned section in which the end stop does not engage the stop surface and the spring exerts a force on the overcenter assembly, and a free-moving section in which the end stop engages the stop surface and the spring does not exert any force on the overcenter assembly.

16 Claims, 11 Drawing Sheets

(51) Int. Cl.
*F16H 7/12* (2006.01)
*F16H 7/08* (2006.01)
*F16H 7/20* (2006.01)
*A01D 69/06* (2006.01)
*A01F 12/56* (2006.01)
*F16H 9/04* (2006.01)

(52) U.S. Cl.
CPC ............. *F16H 7/0827* (2013.01); *F16H 7/20* (2013.01); *F16H 9/04* (2013.01); *F16H 2007/0806* (2013.01); *F16H 2007/0842* (2013.01); *F16H 2007/0865* (2013.01); *F16H 2007/0893* (2013.01)

(58) Field of Classification Search
USPC .................... 474/118, 119, 121, 128, 129
See application file for complete search history.

(56) References Cited

U.S. PATENT DOCUMENTS

| | | | | |
|---|---|---|---|---|
| 429,877 | A * | 6/1890 | Anderson | F16H 7/0827 192/224.1 |
| 654,182 | A * | 7/1900 | Rupsch | B62M 9/16 280/288 |
| 891,636 | A * | 6/1908 | Sandera | F16H 7/16 474/109 |
| 907,289 | A * | 12/1908 | Robinson | F16H 61/66259 474/113 |
| 932,000 | A * | 8/1909 | Cressman | F16H 7/0827 474/119 |
| 1,682,217 | A * | 8/1928 | Dobyne | F16H 7/22 474/128 |
| 1,792,165 | A * | 2/1931 | Hollinger | A01C 3/06 474/121 |
| 1,835,617 | A * | 12/1931 | Stewart | F16H 7/1281 474/135 |
| 1,913,040 | A * | 6/1933 | Pierson | F16H 7/14 198/813 |
| 2,133,512 | A * | 10/1938 | Herge | A01D 34/475 180/19.1 |
| 2,195,229 | A * | 3/1940 | Smart | F16H 7/02 474/119 |
| 2,504,624 | A * | 4/1950 | Barnes | F16H 7/22 474/109 |
| 2,523,166 | A * | 9/1950 | Tom | A01D 34/08 180/19.1 |
| 3,479,894 | A * | 11/1969 | Cofer | F16H 7/1281 474/135 |
| 3,550,463 | A * | 12/1970 | Halls | F16H 7/0827 474/119 |
| 3,628,315 | A * | 12/1971 | Bartholomew | A01D 34/63 56/10.5 |
| 3,800,612 | A * | 4/1974 | Fulghum | A01D 34/6812 474/135 |
| 3,921,793 | A * | 11/1975 | Hutchinson | B65G 23/44 198/813 |
| 4,036,070 | A * | 7/1977 | Knight | F16H 7/0827 474/119 |
| 4,060,964 | A * | 12/1977 | Eaves | D02G 1/0266 474/121 |
| 4,324,552 | A * | 4/1982 | Boushek, Jr. | A01D 69/00 474/115 |
| 4,552,547 | A * | 11/1985 | Carnewal | A01D 41/12 474/101 |
| 4,557,710 | A * | 12/1985 | Greider | A01D 34/69 474/118 |
| 4,566,256 | A * | 1/1986 | Sousek | A01D 43/083 474/115 |
| 4,816,012 | A * | 3/1989 | Bytzek | F16H 7/1218 474/112 |
| 5,078,656 | A * | 1/1992 | Brandenstein | F16H 7/1281 474/112 |
| 5,286,233 | A * | 2/1994 | Engelstad | A01D 46/085 474/101 |
| 5,354,241 | A * | 10/1994 | Trefz | F16H 7/0827 474/101 |
| 5,769,747 | A * | 6/1998 | Kuhn | A01D 34/6806 474/135 |
| 5,782,709 | A * | 7/1998 | Greimann | F16H 7/0827 198/813 |
| 6,129,645 | A * | 10/2000 | Burrows | B62M 9/16 474/112 |
| 6,131,380 | A * | 10/2000 | Browning | A01D 34/64 56/14.7 |
| 6,162,141 | A * | 12/2000 | Rointru | F02B 67/06 474/109 |
| 6,186,918 | B1 * | 2/2001 | Yoo | B62K 25/02 280/229 |
| 6,224,506 | B1 * | 5/2001 | Peeters | F16H 7/0827 192/111.11 |
| 6,334,292 | B1 * | 1/2002 | Walch | A01D 34/76 56/10.2 R |
| 6,773,367 | B2 * | 8/2004 | Laufenberg | A01D 69/08 474/58 |
| 6,796,419 | B2 * | 9/2004 | Sousek | F16H 7/1209 198/813 |
| 7,677,018 | B2 * | 3/2010 | Ducoulombier | A01D 43/081 56/11.6 |
| 7,901,309 | B2 * | 3/2011 | Lehtovaara | F16H 7/08 474/109 |
| 7,918,758 | B2 * | 4/2011 | Di Giacomo | F01P 5/12 474/118 |
| 8,057,335 | B1 * | 11/2011 | Langenfeld | A01D 69/06 474/119 |
| 8,070,633 | B2 * | 12/2011 | Bushnell | B62K 19/34 280/152.1 |
| 8,888,625 | B2 * | 11/2014 | Lehman | F16H 7/1263 474/117 |
| 8,939,857 | B2 * | 1/2015 | Doering | B23D 47/12 474/112 |
| 2001/0051553 | A1 * | 12/2001 | Peeters | F16H 7/0827 474/133 |
| 2004/0009834 | A1 * | 1/2004 | Laufenberg | A01D 69/08 474/73 |
| 2005/0282669 | A1 * | 12/2005 | Bauer | F16H 7/1281 474/117 |
| 2008/0139353 | A1 * | 6/2008 | Stepniak | F16H 7/1281 474/112 |
| 2012/0190488 | A1 * | 7/2012 | Doering | B23D 47/12 474/112 |
| 2013/0165284 | A1 * | 6/2013 | Mennerat | F16H 7/1281 474/112 |
| 2014/0073467 | A1 * | 3/2014 | Doering | F16H 7/16 474/112 |

FOREIGN PATENT DOCUMENTS

| | | |
|---|---|---|
| FR | 2287164 A1 | 5/1976 |
| GB | 1480566 | 7/1977 |
| GB | 1480566 A | 7/1977 |

* cited by examiner

US 9,939,052 B2

TENSION ROLLER ASSEMBLY FOR A BELT DRIVE

CROSS REFERENCE TO RELATED APPLICATION

This application claims priority to Belgium Application No. 2015/5525 filed Aug. 24, 2015, the contents of which are incorporated herein by reference.

FIELD OF THE INVENTION

The present invention relates to a tension roller assembly for a belt drive of a combine harvester for harvesting agricultural crops. The invention further relates to the belt drive comprising the tension roller assembly, to a combine harvester comprising the belt drive, and to a method of changing the gear ratio of a belt drive of a dynamic feed roll of the combine harvester.

BACKGROUND OF THE INVENTION

Belt drives comprising tension rollers for providing tension to the belt have been known for a long time and the application of such belt drives in combine harvesters has also been known for a long time. These belt drives are used to drive the threshing drum of a combine harvester. The threshing drum beats the cut crops to break the crop, and subsequently shakes the grains away from their stalks.

GB1480566, U.S. Pat. No. 3,550,463 and U.S. Pat. No. 4,324,552 disclose earlier concepts of such belt drives including tension rollers.

Apart from the tension roller assemblies disclosed in GB1480566, U.S. Pat. No. 3,550,463 and U.S. Pat. No. 4,324,552, the present applicant currently manufactures a further version of a tension roller assembly. The tension roller assembly is in particular used for a combine harvester having twin rotors, and a dynamic feed roll. The dynamic feed roll is a drum which removes stones and accelerates the crop into the twin rotors. This tension roller assembly is further elucidated in the figures and the description of the present document.

The belt drive of the currently manufactured system has two gear ratios, one for low speed operation and one for high speed operation of the rotating drum. This is required because a combine harvester should be able to harvest different crops having different characteristics. To this end, the rotating drum should be able to rotate at two different speeds.

The currently manufactured system has two gear ratios which are formed by two different driven pulleys of the belt drive, i.e. a driven pulley with a small diameter for the high gear ratio and a driven pulley with a large diameter for the low gear ratio. This allows the belt drive to be operated at two different speeds having two different maximal torques. Because the driven pulleys have different diameters, each gear ratio requires its own belt of a required length. When switching gear ratios, the user also has to exchange one belt for the other belt.

In order to switch gear ratios, it is a requirement to be able to remove the tension from the belt by disengaging the tension roller from the belt. This is also necessary in case of replacement of a damaged or worn-out belt. To this end, the tension roller is incorporated in a tension roller assembly which allows for a movement of the tension roller between an engaged position and a disengaged position from the belt. A spring, generally a compression spring, provides the tension of the roller onto the belt.

The currently manufactured system is equipped with a tension roller assembly having an overcenter assembly which allows the tension roller to be moved between the engaged position and the disengaged position. The current tension roller assembly comprises a support arm which supports the tension roller. The tension roller assembly further comprises a tension arm which is connected to the support arm at one end. The tension arm is connected to a frame at the other end via an overcenter assembly. The overcenter assembly is pivotably mounted to the frame.

When the tension roller is moved from the engaged position to the disengaged position, it has to move beyond the center position of the overcenter assembly. During the movement from the engaged position to the center position, the spring is further compressed, and the movement is therefore carried out against the compression force of the spring. When the overcenter assembly passes the center position, the spring starts to extend and during a further movement from the center position to the disengaged position, the pulley is retracted from the belt, thereby relieving the belt from its tension.

The system which is currently manufactured has a number of drawbacks.

First, the system is relatively unpractical for a user who wishes to switch the tension roller assembly between the engaged position and the disengaged position. The rotation of the overcenter assembly between the engaged position and the disengaged position is carried out under the force of the spring, and the spring force may be rather high. This results in a strong force on the user. The rotation is generally carried out with a wrench. Because of the high spring force, the hand of the user may get stuck between the wrench and the machine. In extreme cases, this may even lead to an injury of the user.

Further, the present assembly has relatively little room for the belt to be removed from the belt drive when the tension roller is in the disengaged position. This is a result of the specific configuration of the present assembly. The limited space makes it difficult for a user to exchange one belt for the other belt.

Further, during operation the belt generally stretches somewhat as a result of pulling forces. The stretching results in an extension of the spring which pushes the tension roller against the belt. The stretching may become particularly large when large, unevenly distributed packages enter the combine, causing high torque peaks on the belt drive.

The stretching in turn results further inward position of the tension roller, caused by an extension of the spring. The extension of the spring results in a lower spring force and a lower force exerted by the tension roller and thus, in a lower tension of the belt. This lowers the torque which can be applied by the belt drive and results in earlier slipping of the belt and, eventually, blockage of the dynamic feed roller.

SUMMARY OF THE INVENTION

In accordance with an aspect of the present invention, there is provided a tension roller assembly for a belt drive of a combine harvester which makes the transition between two different gear ratios of the belt drive easier to carry out. More specifically, there is provided a tension roller assembly for a belt drive of a combine harvester which can be operated with more ease and a lower risk of injury for the user.

In accordance with another aspect of the present invention, there is provided a tension roller assembly which shows a lower drop in tension of the belt in case of peak loads on the rotating drum, thereby reducing slipping of the belt at these peak loads.

In accordance with yet another aspect of the present invention, there is provided a tension roller assembly for a belt drive of a combine harvester which provides more clearance in the disengaged position for exchanging the belt.

In accordance with still another aspect of the present invention, there is provided a tension roller assembly of a belt drive of a combine harvester which is an alternative to the prior art.

In accordance with an aspect of the present invention, there is provided a tension roller assembly configured for tensioning a belt of a belt drive, the tension roller assembly comprising:

a tension roller, a pivotable support arm having a support pivot at a pivot end thereof, wherein the tension roller is connected in a rotatable manner to an opposite, roller end of the support arm, the support arm comprising a tension arm connection point having a rod guide, a tension arm connected at a first end thereof to the tension arm connection point of the support arm, wherein the tension arm comprises a compression spring configured to press the tension roller with force against the belt, wherein the tension arm comprises a first spring stop and a second spring stop mounted on the rod, wherein the spring extends between the first spring stop and the second spring stop and is maintained under compression, a mounting plate, an overcenter assembly connected to a second end of the tension arm, the second end being opposite to the first end, wherein the overcenter assembly connects the tension arm to the mounting plate, the overcenter assembly being configured to make a pivoting movement over a pivot trajectory between:

an engaged position which is associated with an engaged state of the tension roller assembly, and a disengaged position which is associated with a disengaged state of the tension roller assembly, wherein the overcenter assembly further has a center position which is located between the engaged position and the disengaged position, wherein the tension arm comprises a rod which extends from the overcenter assembly to the support arm and through the rod guide, wherein the rod guide allows the rod to slide relative to the support arm, wherein the tension arm comprises an end stop which is mounted to an end of the rod which protrudes from the rod guide, wherein the support arm comprises a stop surface on the side of the end stop, the stop surface being configured to engage the end stop, wherein the end stop and the stop surface limit an extension of the spring during a movement of the overcenter assembly from the center position to the disengaged position, wherein the trajectory of the overcenter assembly between the center position and the disengaged position is divided in:

a tensioned section in which the end stop does not engage the stop surface and the spring exerts a force on the overcenter assembly, and a free-moving section in which the end stop engages the stop surface and the spring does not exert any force on the overcenter assembly.

An advantage is that due to the presence of the free-moving section, the user can switch the overcenter assembly with more ease, because the force of the spring is not present at the disengaged position. Further, there is an advantage in that the tension roller can be retracted further from the belt making the exchange of one belt for the other easier. A risk of injury is also reduced.

It will be clear that the mounting plate can be a separate mounting plate which is fixed to the chassis or can be a part of the chassis itself, when the overcenter assembly is connected directly to the chassis. The term mounting plate is to be interpreted broadly.

In an embodiment, a longer spring having a lower spring rate can be used than in the tension roller assembly of the prior art. This advantageously results in less reduction of the spring force when the belt stretches and results in a greater maximum torque.

In an embodiment, the overcenter assembly comprises a pivot arm which is connected to the mounting plate via an pivot axis, wherein the pivot arm comprises a free end, wherein the tension arm comprises an intermediate member which is connected at one side thereof to the rod, wherein the intermediate member is connected at an opposite side thereof to the free end via a hinge, wherein the tension roller assembly comprises a rod adjustment device for adjusting the position of the rod relative to the overcenter assembly.

In an embodiment, the rod adjustment device is configured for adjusting the position of the rod relative to the intermediate member.

In an embodiment, the tension roller assembly comprises:

a first spring stop adjustment member for adjusting the position of the first spring stop and/or a second spring stop adjustment member for adjusting the position of the second spring stop.

In an embodiment, the end stop and the stop surface are located on the opposite side of the support arm as the spring.

In an embodiment, the tensioned section of the trajectory of the overcenter assembly has an angle of between 70 and 90 degrees and the free-moving section of the trajectory of the overcenter assembly has an angle of between 10 and 60 degrees.

In embodiment, the rod is provided with thread and wherein the rod adjustment device and the second spring stop adjustment member are nuts.

In an embodiment, the tension arm connection point comprises a hinge via which the tension arm is connected in a hinging manner to the support arm. The rod guide may be incorporated in the hinge.

In an embodiment, a maximum extension of the spring during a transition between the engaged state and the disengaged state is determined by a distance over which the rod can slide relative to the support arm until the end stop engages the stop surface.

In an embodiment, a length of the spring in the uncompressed state is between 250 and 300 mm, in particular 280 mm. In an embodiment, a spring coefficient of the spring is between 20 and 30 N/mm, in particular between 26 and 27 N/mm.

In an embodiment, a design length of the spring in the compressed, engaged state is between 130 and 150 mm in particular between 138 and 143 mm.

In accordance with another aspect of the present invention, there is provided a belt drive comprising the tension roller assembly according to any of the preceding claims, the belt drive comprising:

a first driven pulley and a second driven pulley which are provided on a same driven axis, a driving pulley, a first belt interconnecting the first driven pulley with the driving pulley, a second belt interconnecting the second driven pulley with the driving pulley, wherein the first and second belt are configured to be used alternately.

In an embodiment of the belt drive, the second driven pulley has a larger diameter than the first driven pulley, wherein the second driven pulley is movable between an inoperative position and an operative position in which it extends around the first driven pulley.

In an embodiment, the belt drive is configured to be switched by a user between a low rotational speed, in particular somewhere in a range of 500-700 rpm, more in particular 640 rpm, and a high rotational speed, in particular somewhere between 1000 and 1200 rpm, more in particular 1100 rpm, wherein the belt drive provides a higher maximum torque in the low speed than in the high speed. The low and high rotational speed result in lower grain damage. For instance, corn and beans are more sensitive and require a lower rotational speed, whereas grain is less sensitive and may be processed at a higher rotational speed.

In accordance with yet another aspect of the present invention, there is provided a combine harvester comprising the belt drive according to the invention.

In accordance with still another aspect of the present invention, there is provided a method of changing the gear ratio of a belt drive of a dynamic feed roll of a combine harvester, the method comprising switching the tension roller assembly to the disengaged state by pivoting the overcenter assembly to the disengaged position, removing a first belt of the belt drive, installing a second belt on the belt drive, switching the tension roller assembly to the engaged state by pivoting the overcenter assembly to the engaged position, operating the combine harvester in the other gear ratio.

BRIEF DESCRIPTION OF THE DRAWINGS

These and other aspects of the invention will be more readily appreciated as the same becomes better understood by reference to the following detailed description and considered in connection with the accompanying drawings in which like reference symbols designate like parts.

DETAILED DESCRIPTION OF THE INVENTION

Figure 1:
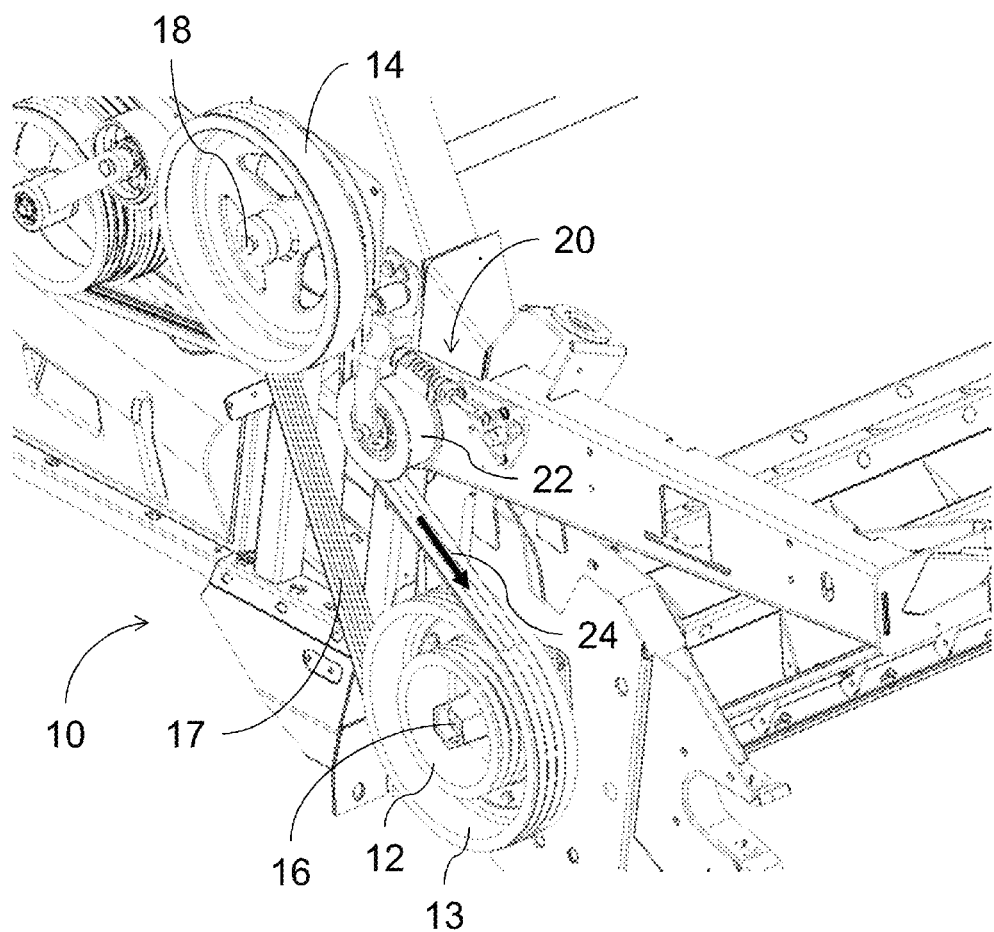
FIG. 1 shows an isometric view of a belt drive according to the prior art.
Figure 2:
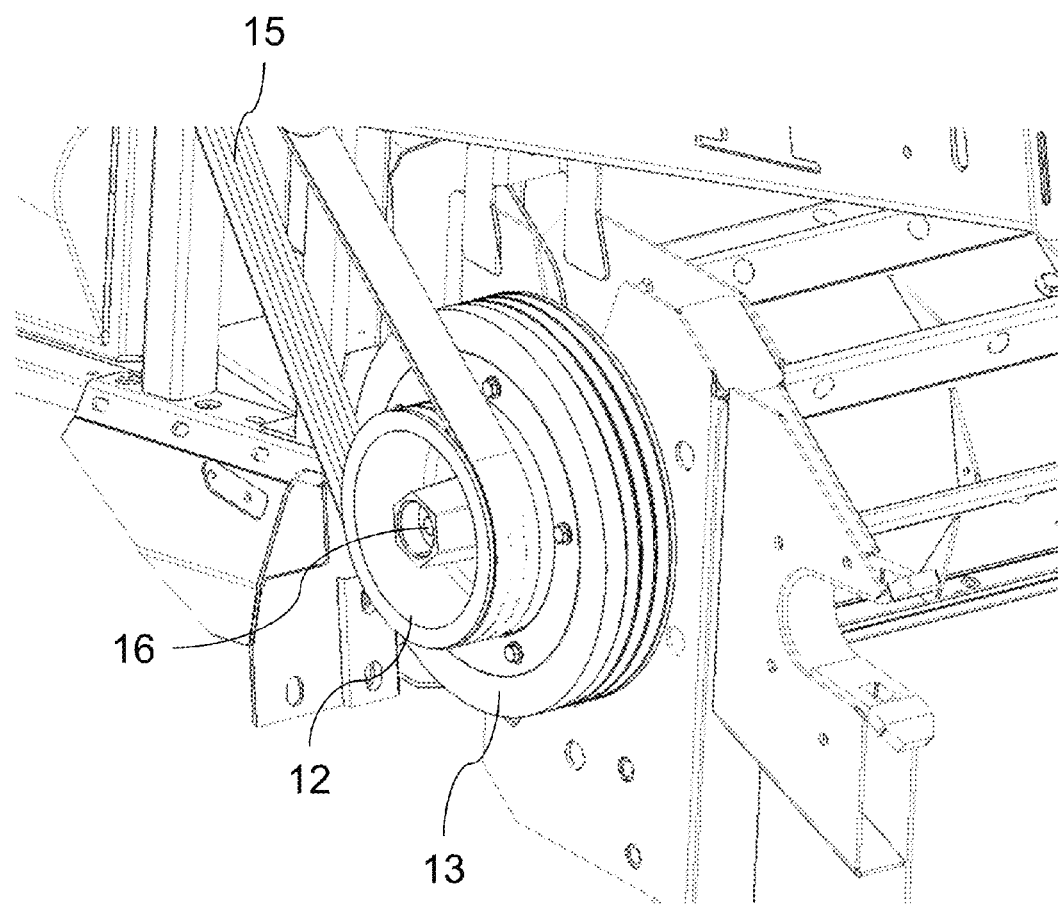
FIG. 2 shows a detail of a belt drive according to the prior art.

Turning to FIGS. 1 and 2, a belt drive 10 according to the prior art is shown. The belt drive 10 is used in a combine harvester for driving the dynamic feed roll. The shown belt drive is currently manufactured by the present applicant. The belt drive comprises a first driven pulley 12 and a second driven pulley 13. The first driven pulley 12 is smaller than the second driven pulley 13. The small and large driven pulley are provided on the same driven axis 16. The belt drive further comprises a driving pulley 14.

Turning in particular to FIG. 2, the belt drive has two gears. In the first gear, the small driven pulley 12 is used and the large driven pulley 13 is in an inoperative position. In this gear, the belt drive has a high speed and a low torque. When the belt drive needs to be switched to the low gear ratio, the belt 15 is removed. The large driven pulley 13 is moved from the inoperative position shown in FIG. 2 to the operative position shown in FIG. 1. This can be performed by removing the large driven pulley 13 from the axis 16, turning the pulley 13 around and mounting the large driven pulley 13 in reverse orientation on the axis 16. The large driven pulley now extends around the small driven pulley as is shown in FIG. 1. The belt 15 is replaced by a longer belt 17. The belts 15, 17 are V-belts.

The axis 16 of the driven pulleys 12, 13 and the axis 18 of the driving pulley 14 are parallel.

FIG. 1 shows the tension roller assembly 20 with which the belt 15, 17 is held under tension. The tension roller assembly 20 comprises a tension roller 22. Prior to removing the belt 15, 17, the tension roller 22 needs to be retracted from an engaged position to a disengaged position. After the exchanging of the driven pulley and the belt, the tension roller assembly is moved back to the engaged position.

In the high gear, i.e. with the small driven pulley 13, the belt drive 10 has a high rotational speed, in particular in a range of 1000-1200 rpm, more in particular 1100 rpm. In the low gear, i.e. with the large driven pulley 13, the belt drive has a low rotational speed, in particular 500-700 rpm, more in particular 640 rpm. Obviously, the belt drive provides a higher maximum torque in the low speed than in the high speed. The belts 15, 17 are driven in the direction indicated with arrow 24.

Figure 3:
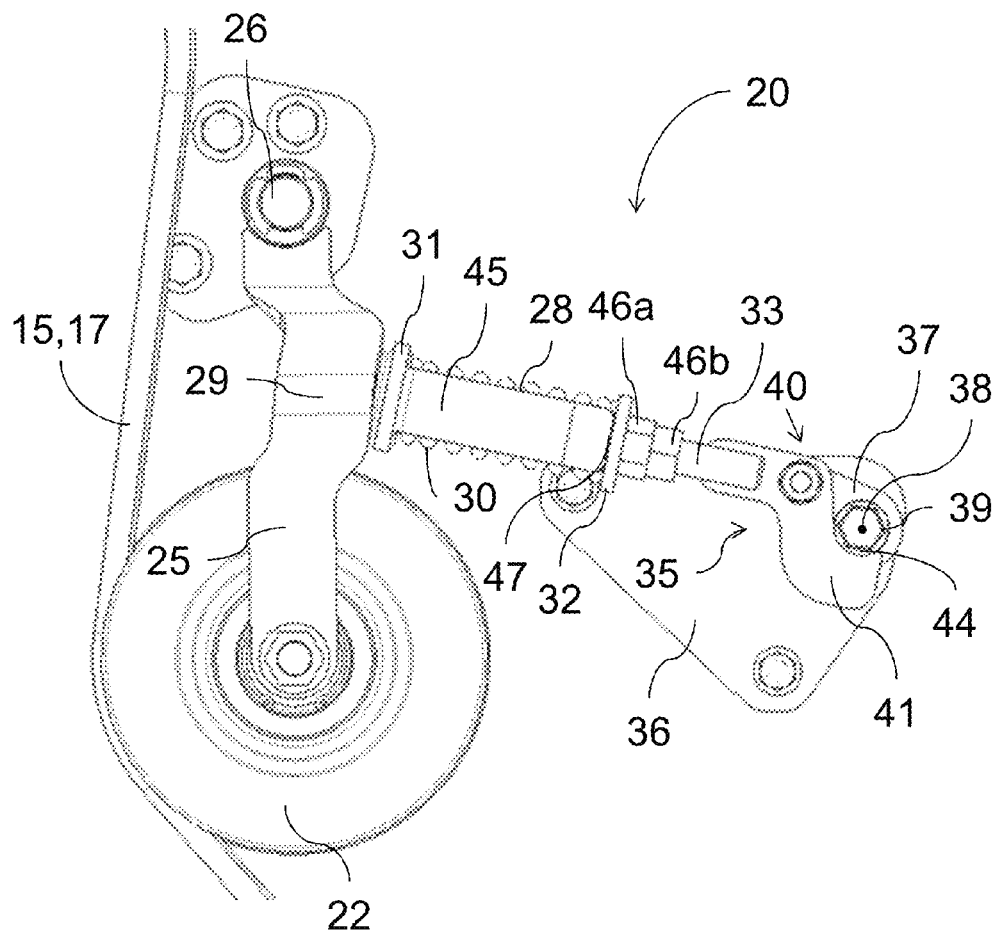
FIG. 3 shows a side view of a tension roller assembly according to the prior art in a engaged state.
Figure 4:
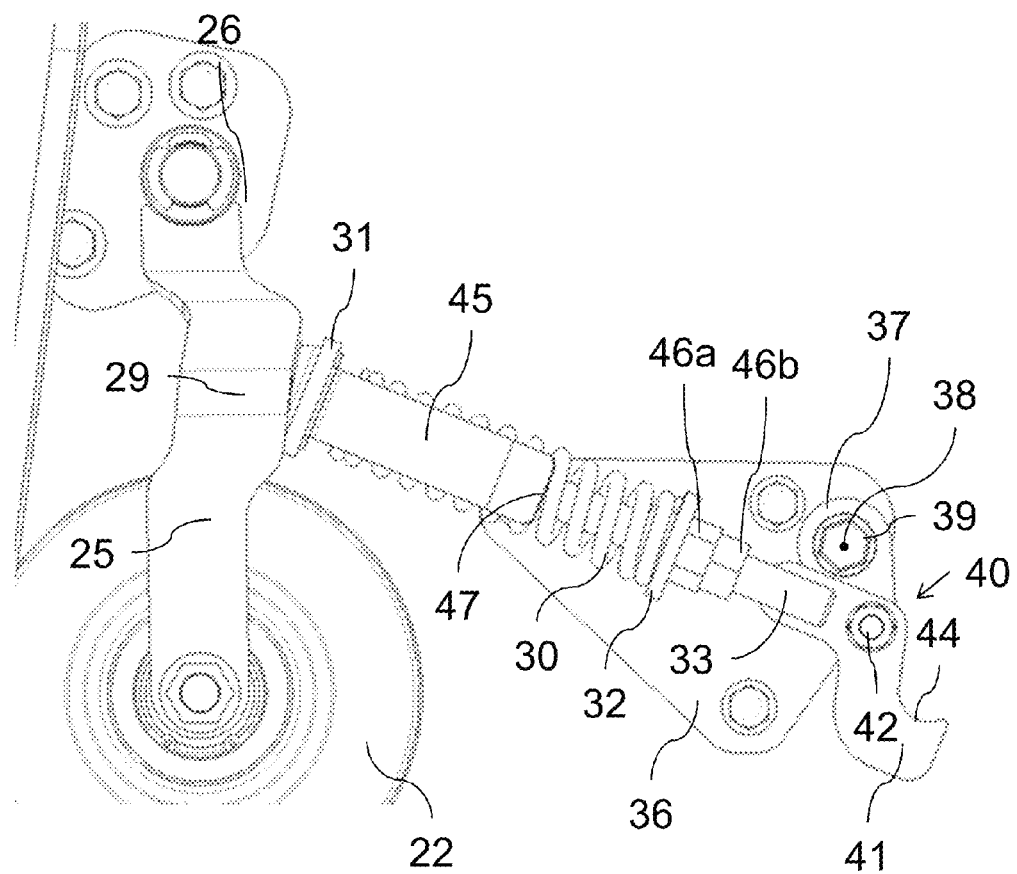
FIG. 4 shows a side view of a tension roller assembly according to the prior art in a disengaged state.

Turning to FIGS. 3 and 4, the tension roller assembly 20 according to the prior art is shown. FIG. 3 shows the tension roller assembly 20 in the engaged state and FIG. 4 shows the tension roller in the engaged state.

The tension roller assembly comprises the roller 22 which is rotatably mounted to a support arm 25. The support arm comprises a pivot 26 at one end, allowing the tension roller assembly to pivot about an angle α as indicated in FIG. 3.

The tension roller assembly further comprises a tension arm 28 which is connected at a connection point 29 to the support arm 25. The tension arm comprises a spring 30 which is under a compression force. The spring is mounted between a first spring stop 31 on the side of the support arm 25 and a second spring stop 32 which is mounted to a rod 33. The first spring stop 31 acts directly on the support arm 25. The second spring stop acts on the rod 33.

The tension roller assembly according to the prior art is switched between the engaged state and the disengaged state by an overcenter assembly 35. The overcenter assembly connects the tension arm 28 to a mounting plate 36. The mounting plate 36 may be connected to a frame of the belt drive or to a frame of the combine harvester.

The overcenter assembly 35 comprises a pivot arm 37 which pivots about an axis 38. The pivot arm pivots between an engaged position shown in FIG. 3 and a disengaged position shown in FIG. 4. A center position exists between these two. The center position is the position in which the rod 33 is aligned with a straight line extending between the connection point 29 and the pivot axis 38.

A bolt 39 is provided on the axis 38. At a free end 40 of the pivot arm 37, an intermediate member 41 is connected to the pivot arm 37. The intermediate member 41 is connected at the other side thereof to the rod 33. The connection between the intermediate member 41 and the pivot arm 37 is a hinge 42.

The intermediate member comprises a curve stop surface 44 which acts on the bolt 39 and thereby maintains the tension arm assembly in the engaged state. The stop surface 44 prevents the pivot arm from pivoting any further in the clockwise direction. This is necessary, because the spring 30 presses the rod 33 with force against the intermediate member 41, and as a result the intermediate member 41 will exerts a force on the pivot arm 37. This will create a clockwise moment on the pivot arm, because in the engaged position the pivot arm 37 is beyond the center position.

An indicator plate 45 is provided adjacent the spring 30. A double nut 46A, 46B is provided on the rod 33 which is provided with thread. The position of the second spring stop 32 can be adjusted with the double nut 46A, 46B. This is done by letting the second spring stop 32 engage a stop surface 47 at the end of the indicator plate 45.

Turning in particular to FIG. 4, the tension roller assembly is shown in the disengaged state. The pivot arm 37 has been pivoted about the pivot axis 38. This carried out by a user who puts a wrench or other tool on the bolt 39 and rotates the pivot arm 37 with the tool. The pivot arm 37 has moved from the engaged position to the center position and from the center position to the disengaged position. The spring 30 is in the extended state. The disengaged position is defined by the extended length of the spring. The roller 22 is disengaged from the belt and the belt drive can be switched from the low gear to the high gear or vice versa.

Throughout the movement of the overcenter assembly between the engaged position and the disengaged position, the spring acts on the overcenter assembly and causes a moment on the pivot arm. This makes it difficult to carry out the pivoting action of the pivot arm 37 by the user. In extreme cases, this may lead to an injury of the user.

Figure 5:
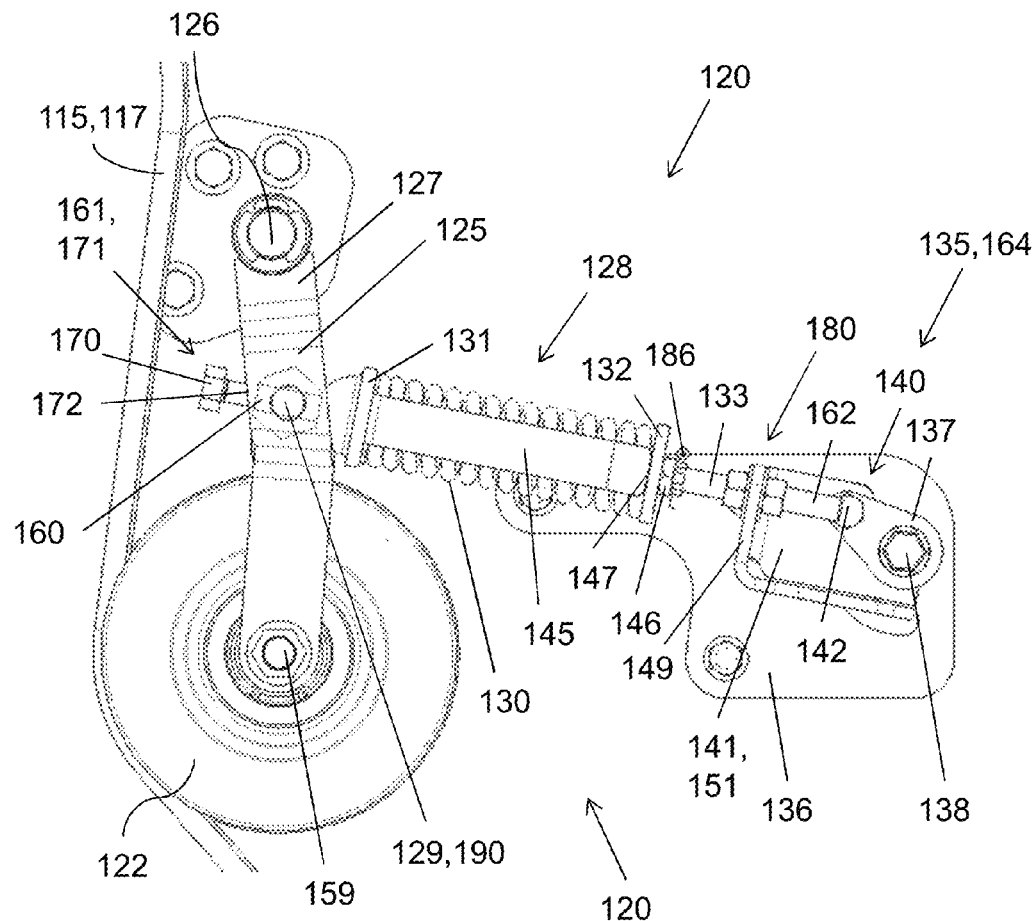
FIG. 5 shows a side view of a tension roller assembly according to an exemplary embodiment of the present invention in a engaged state.
Figure 6:
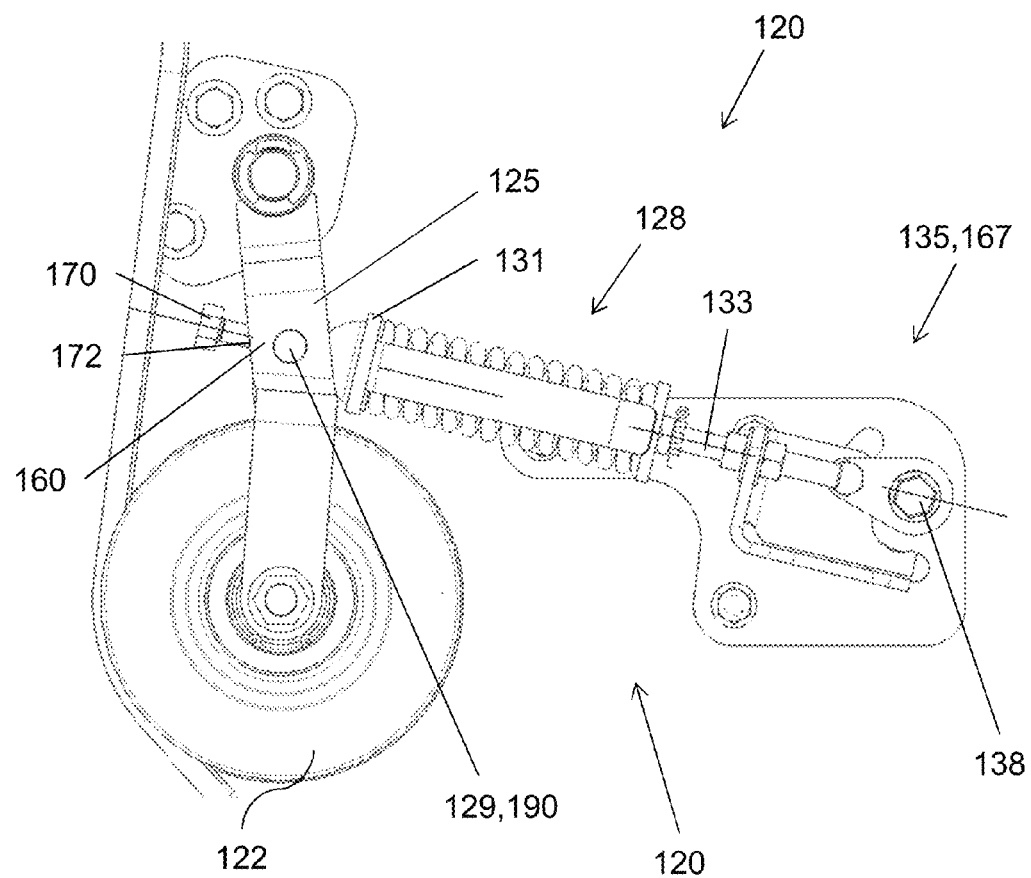
FIG. 6 shows a side view of a tension roller assembly according to an exemplary embodiment of the present invention in a center position.
Figure 7:
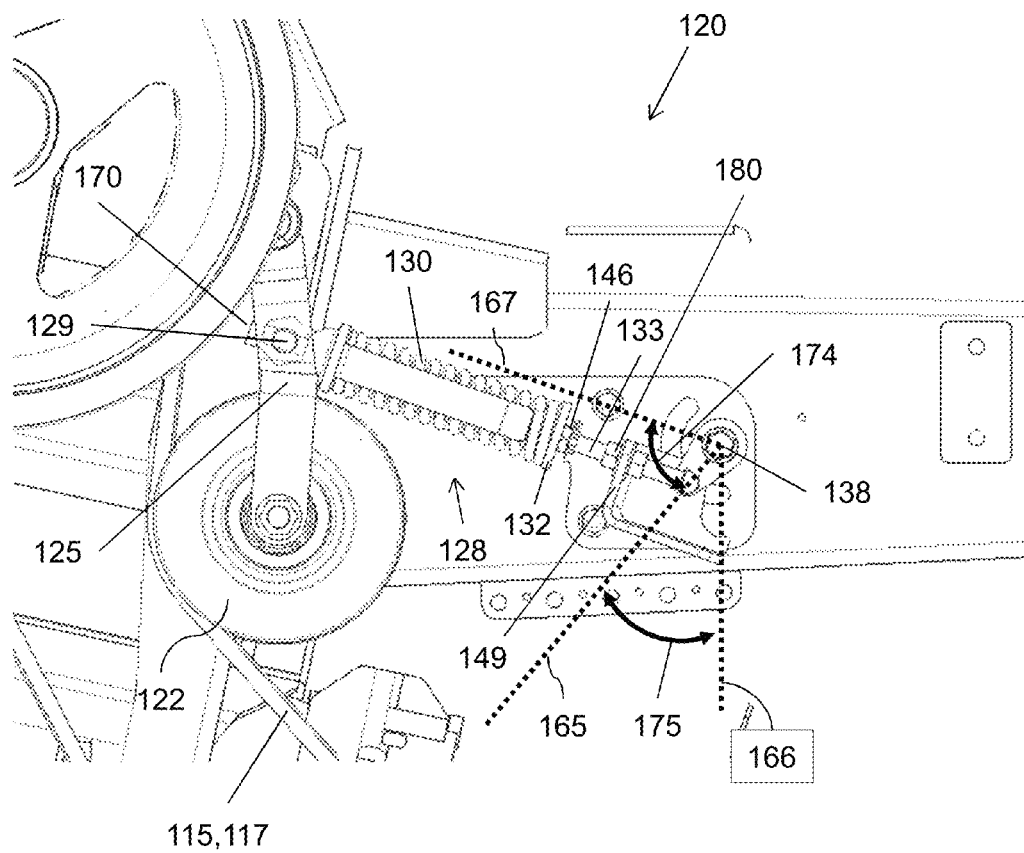
FIG. 7 shows a side view of a tension roller assembly according to an exemplary embodiment of the present invention on the border of a tensioned section and a free-moving section.

Turning to FIGS. 5, 6, and 7, the tension roller assembly 120 according to the invention is shown. The tension roller assembly according to the invention is in particular intended to be used with a belt drive which drives a dynamic feed roll. The dynamic feed roll has a stone protection system which may be installed tangentially across the two longitudinal rollers in the combine harvester.

The dynamic feed roll accelerates the harvested grain in the direction of the twin rotors and delivers the grain in a uniform fashion to the twin rotors. The dynamic feed roll also provides an effective method for stone protection on the move, by way of a stone catcher trough beneath the feed rotor. The dynamic feed roll is also referred to as a rotating drum.

The tension roller assembly 120 is similar to the tension roller assembly 20 of the prior art in several ways. The tension roller assembly 120 is configured for tensioning a belt 115, 117 of a belt drive.

The tension roller assembly 120 comprises a tension roller 122 and a pivotable support arm 125. The pivotable support arm has a support pivot 126 at a pivot end 127 thereof. The tension roller 122 is connected in a rotatable manner to an opposite, roller end of the support arm via an axle 159 heaving a bearing. The support arm comprises a tension arm connection point 129 having a rod guide 160. The rod guide extends through the support arm 125. The tension arm connection point is located between the tension roller and the support pivot 126.

The tension roller assembly further comprises a tension arm 128 connected at a first end 161 thereof to the tension arm connection point 129 of the support arm 125. The tension arm comprises a compression spring 130 configured to press the tension roller 122 with force against the belt.

The support spring of the invention 125 is longer than the support spring 25 of the prior art, and has a lower spring coefficient. This provides an advantage that in case of stretching of the belt 115, 117 under the driving force of the pulley, the force which is exerted by the tension roller decreases less and is better maintained at the required level. This reduces slipping of the belt at high torques.

The tension arm 128 comprises a first spring stop 131 which is loosely provided on the rod, but may also be connected to the support arm 125 and a second spring stop 132 mounted on a rod 133. The spring 130 extends between the first spring stop and the second spring stop and is maintained under compression. The tension roller assembly has an indicator plate 145. During installation of the tension roller assembly, the second spring stop is positioned against the stop surface 147 of the indicator plate 145.

The tension roller assembly comprises a mounting plate 136.

The tension roller assembly further comprises an overcenter assembly 135 connected to a second end 162 of the tension arm, the second end being opposite to the first end 161. The overcenter assembly 135 connects the tension arm 128 to the mounting plate 136. The overcenter assembly 135 is configured to make a pivoting movement over a pivot trajectory between an engaged position 164, shown in FIG. 5, which is associated with an engaged state of the tension roller assembly 120, and a disengaged position 166 which is associated with a disengaged state of the tension roller assembly.

Turning to FIG. 6, the overcenter assembly further has a center position 167 which is located between the engaged position 164 and the disengaged position 166. In the center position 167, the rod 133 is aligned with a straight line extending between the connection point 129 and the pivot axis 138.

The tension arm 128 comprises a rod 133 which extends from the overcenter 135 assembly to the support arm 125 and through the rod guide 160. The rod guide 160 allows the rod 133 to slide relative to the support arm 125.

The tension arm 128 comprises an end stop 170 which is mounted to an end 171 of the rod 133 which protrudes from the rod guide. The support arm comprises a stop surface 172 on the side of the end stop 170 which is configured to engage the end stop. The end stop and the stop surface are located on the opposite side of the support arm as the spring.

In the disengaged state, the end stop 170 limits the extension of the ring. Between the end stop 170 and the second spring stop 132, the rod 133 is under a tension force which counteracts the compression force in the spring.

Turning in particular to FIG. 7, the trajectory of the overcenter assembly 135 between the center position 167 and the disengaged position 166 is divided in (a) a tensioned section 174 in which the end stop 170 does not engage the stop surface 172 and the spring exerts a force on the overcenter assembly, and (b) a free-moving section 175 in which the end stop 170 engages the stop surface 172 and the spring does not exert any force on the overcenter assembly.

The tensioned section 174 of the trajectory of the overcenter assembly between the center position and the disengaged position has an angle of between 70 and 90 degrees. The free-moving section 175 of the trajectory of the overcenter assembly has an angle of between 10 and 60 degrees.

Figure 8:
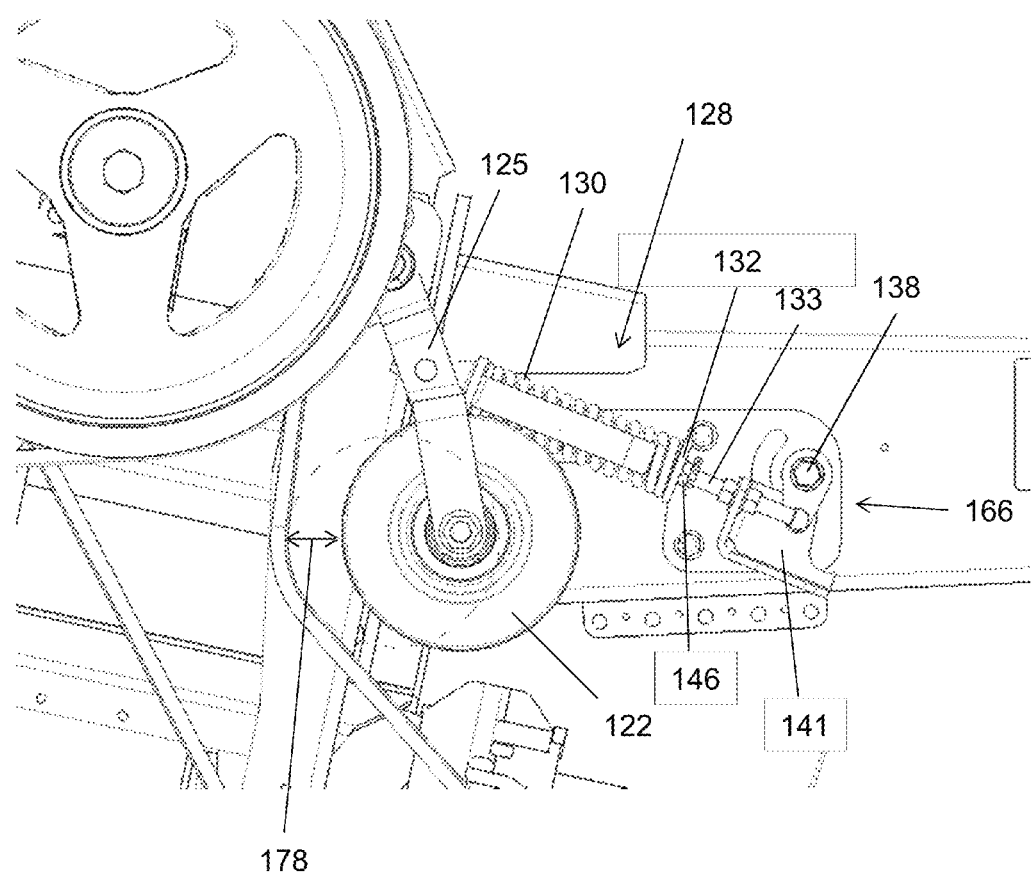
FIG. 8 shows a side view of a tension roller assembly according to an exemplary embodiment of the present invention in a free-moving section of the disengaged state.

Turning to FIG. 8, the free-moving section 175 allows a free movement of the tension roller 122 away from the belt 115, 117 over a considerable distance. This creates more clearance at the belt, making it easier for the user to exchange the belt.

Further, the free-moving section 175 makes it easier for a user to rotate the overcenter assembly and reduces the chance of any injury. In the free-moving section, there is no torque of the tension arm on the overcenter assembly, and the hand of the user cannot get stuck between the wrench and any part of the combine harvester.

FIG. 7 shows the tension roller assembly on the border 165 between the tensioned section 174 and the free-moving section 175

The overcenter assembly 135 comprises the pivot arm 137 which is connected to the mounting plate via a pivot axis 138, wherein the pivot arm comprises a free end 140. The tension arm 128 comprises an intermediate member 141 which is connected at one side thereof to the rod 133, wherein the intermediate member is connected at an opposite side thereof to the free end 140 via a hinge 142.

The tension roller assembly comprises a rod adjustment device 180 for adjusting the position of the rod relative to the overcenter assembly. The rod adjustment device 180 is configured for adjusting the position of the rod 133 relative to the intermediate member 141 in the axial direction of the rod. The intermediate member 141 comprises a flange 149 which extends at right angles to a body 151 of the intermediate member. The flange comprises hole through which the rod 133 extends.

The rod is provided with thread and the rod adjustment device 180 and the second spring stop adjustment member 146 are nuts. The rod adjustment device 180 comprises two nuts. The rod adjustment device 180 is used to adjust the position of the rod 133 relative to the hole in the flange 149.

It is noted that the spring is adjusted with the rod adjustment device. The second spring stop adjustment member 146 is generally not used by the user, but only installed during the manufacturing of the tension roller assembly. The second spring stop adjustment member 146 is secured in place with a securing member 186. This may be a pin which extends through a hole in the rod 133.

The intermediate member 141 further comprises a stop member 144 for limiting a pivoting movement of the overcenter assembly in the engaged position.

In this embodiment the tension roller assembly comprises a second spring stop adjustment member 146 for adjusting the position of the second spring stop 132. Alternatively, the tension roller may comprise a first spring stop adjustment member for adjusting the position of the first spring stop.

The tension arm connection point 129 comprises a hinge 190 via which the tension arm 128 is connected in a hinging manner to the support arm 125. The hinge comprises the rod guide 160.

It will be clear that a maximum extension of the spring during a transition between the engaged state and the disengaged state is determined by a distance 191 over which the rod 133 can slide relative to the support arm until the end stop engages the stop surface.

In the present embodiment, a length of the spring in the uncompressed state is between 250 and 300 mm, in particular 280 mm. It will be noted that in the disengaged position 166, the spring is still under compression force but this force is not exerted on the overcenter assembly.

A spring coefficient of the spring is between 20 and 30 N/mm, in particular between 26 and 27 N/mm. A design length of the spring in the compressed state is 141 mm.

It will be clear to the skilled person that the length of the spring and the spring coefficient as indicated above may vary according to specific requirements of the belt drive.

Figure 9:
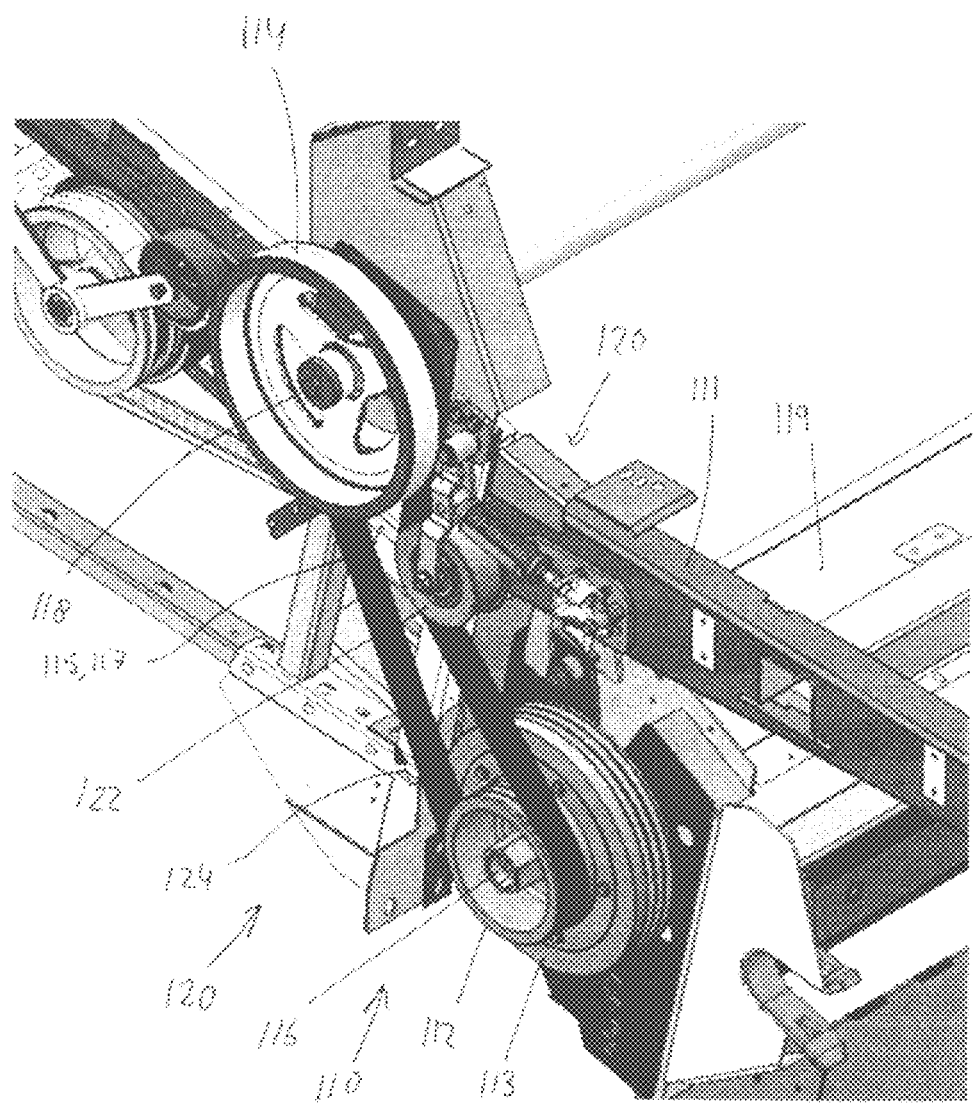
FIG. 9 shows an isometric view of the tension roller assembly according to an exemplary embodiment of the present invention in a belt drive for driving a rotating drum in a combine harvester.

Turning to FIG. 9, the tension roller assembly 120 according to the invention is part of a belt drive 110. The belt drive 110 comprises a driving pulley 114 which rotates about an axis 118. The belt drive comprises a first, small driven pulley 112 and a second, larger driven pulley 113 which rotate about axis 116. The belt drive rotates in the direction 124. The belt drive 110 is mounted on the chassis 111 of the combine harvester and drives the rotating drum 119. The present invention relates to a belt drive comprising the tension roller assembly and to a combine harvester comprising the belt drive according to the invention.

Figure 10:
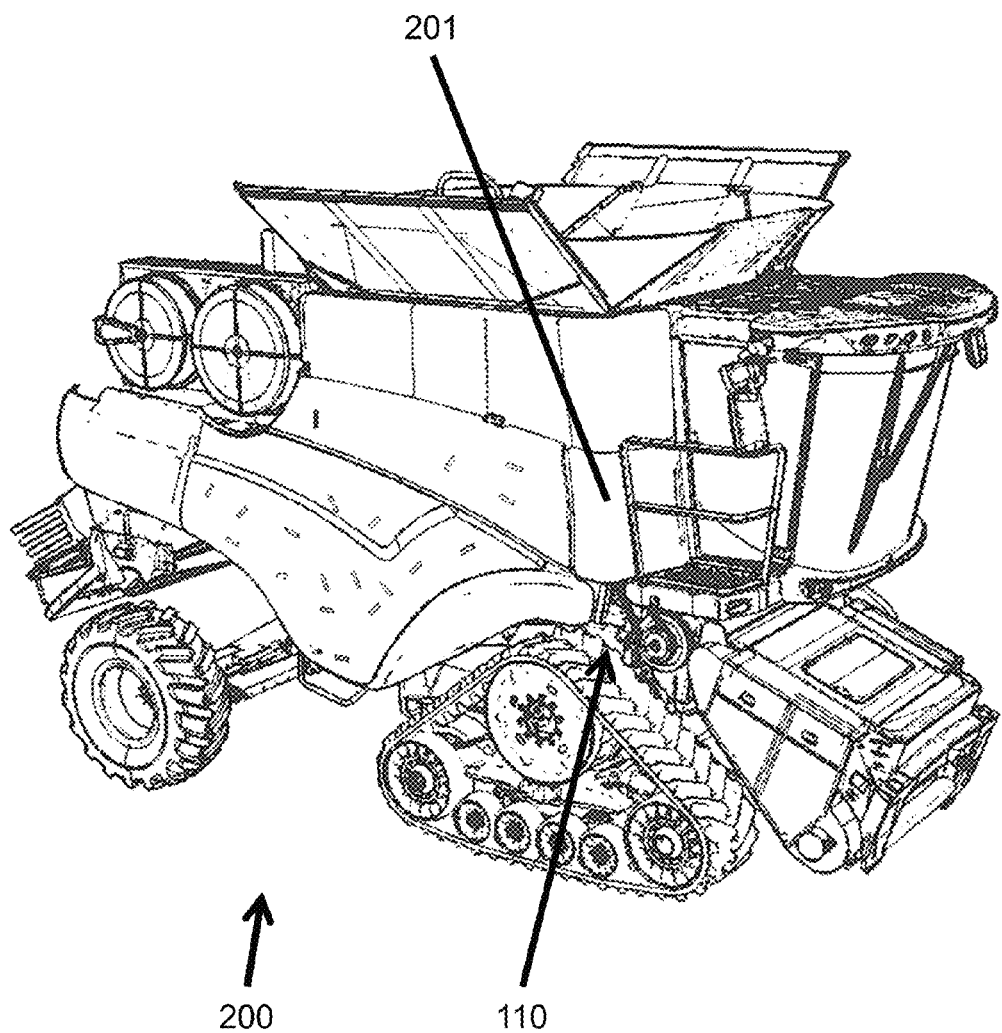
FIG. 10 shows an isometric view of a combine harvester, in accordance with an exemplary embodiment of the present invention.
Figure 11:
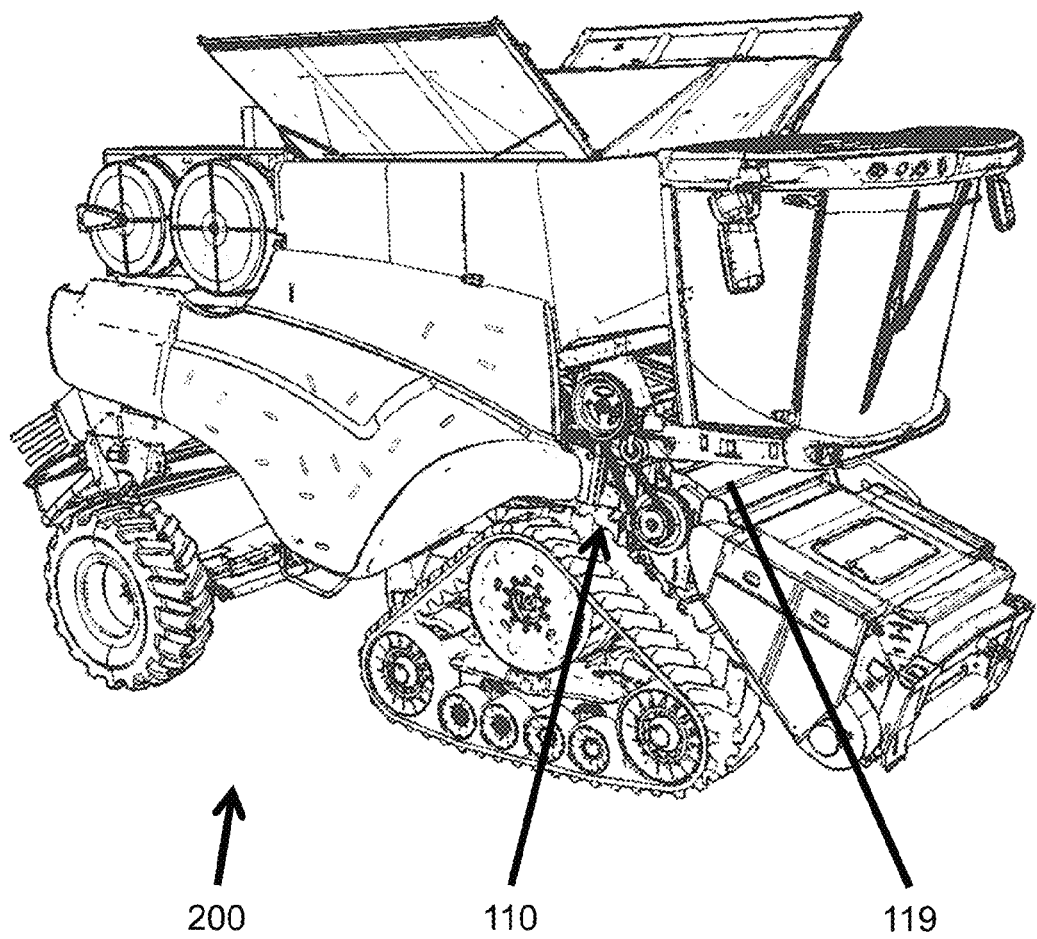
FIG. 11 shows an isometric view of a combine harvester according to an exemplary embodiment of the present invention with a cover plate removed.

Turning to FIGS. 10 and 11, a combine harvester 200 according to the invention is shown, comprising the belt drive 110 according to the invention. The belt drive is partially covered by a cover plate 201 in FIG. 10. In FIG. 11 the cover plate 201 is removed.

Operation

In operation, the combine harvester may initially be operated in a first gear. In order to switch gears, the combine harvester is stopped. Next, the tension roller assembly is switched to the disengaged state by pivoting the overcenter assembly 135 to the disengaged position 166. Next, the belt 115, 117 is removed. The driving pulley is also switched as discussed in relation to the system of the prior art. A first belt of the belt drive is removed and a second belt is installed on the belt drive.

Next, the tension roller assembly is switched to the engaged state by pivoting the overcenter assembly to the engaged position. The combine harvester can now be operated in the second gear.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as

What is claimed is:

1. A tension roller assembly configured for tensioning a belt of a belt drive, the tension roller assembly comprising:
   a tension roller;
   a pivotable support arm having a pivot end and a roller end, the support arm comprising a support pivot at the pivot end, the support arm further comprising a tension arm connection point having a rod guide, wherein the tension roller is connected in a rotatable manner to the roller end of the support arm;
   a tension arm having a first end and a second end, the tension arm connected at the first end to the tension arm connection point of the support arm, the tension arm comprising a compression spring configured to press the tension roller with force against the belt, the tension arm further comprising a rod, a first spring stop, and a second spring stop mounted on the rod, wherein the compression spring extends between the first spring stop and the second spring stop and is maintained under compression;
   a mounting plate;
   an overcenter assembly connected to the second end of the tension arm, the overcenter assembly comprising a pivot arm which is connected to the mounting plate via a pivot axis, the pivot arm comprising a free end, the overcenter assembly configured to make a pivoting movement over a pivot trajectory between:
      an engaged position which is associated with an engaged state of the tension roller assembly,
      a disengaged position which is associated with a disengaged state of the tension roller assembly, and
      a center position which is located between the engaged position and the disengaged position; and
   a rod adjustment device for adjusting a position of the rod relative to the overcenter assembly;
   wherein the rod extends from the overcenter assembly to the support arm and through the rod guide, wherein the rod guide allows the rod to slide relative to the support arm,
   wherein the tension arm further comprises an end stop which is mounted to an end of the rod which extends through the rod guide,
   wherein the support arm further comprises a stop surface on a side adjacent the end stop, the stop surface being configured to engage the end stop, wherein the end stop and the stop surface keep the spring under compression and prevent the spring from reaching its full length during a movement of the overcenter assembly from the center position to the disengaged position,
   wherein the tension arm further comprises an intermediate member which is connected at one side thereof to the rod, wherein the intermediate member is connected at an opposite side thereof to the free end of the pivot arm via a hinge, and
   wherein the pivot trajectory of the overcenter assembly between the center position and the disengaged position is divided into:
      a tensioned section in which the end stop does not engage the stop surface and the spring exerts a force on the overcenter assembly, and
      a free-moving section in which the end stop engages the stop surface and the spring does not exert any force on the overcenter assembly.

2. The tension roller assembly of claim 1, wherein the rod adjustment device is configured for adjusting the position of the rod relative to the intermediate member.

3. The tension roller assembly of claim 1, wherein the rod is movable relative to the intermediate member.

4. The tension roller assembly of claim 1, further comprising:
   a first spring stop adjustment member for adjusting a position of the first spring stop; and
   a second spring stop adjustment member for adjusting a position of the second spring stop.

5. The tension roller assembly of claim 4, wherein the first spring stop adjustment member is secured in place with a securing member, and wherein the second spring stop adjustment member is secured in place with a securing member.

6. The tension roller assembly of claim 1, wherein the end stop and the stop surface are located on an opposite side of the support arm as the compression spring.

7. The tension roller assembly of claim 1, wherein the tensioned section of the trajectory of the overcenter assembly has an angle of between 70 and 90 degrees and wherein the free-moving section of the trajectory of the overcenter assembly has an angle of between 10 and 60 degrees.

8. The tension roller assembly of claim 1, further comprising:
   a first spring stop adjustment member for adjusting a position of the first spring stop; and
   a second spring stop adjustment member for adjusting a position of the second spring stop,
   wherein the tension roller assembly further comprises a rod adjustment device for adjusting a position of the rod relative to the overcenter assembly, and
   wherein the rod is provided with a thread, and wherein the rod adjustment device and the second spring stop adjustment member are nuts.

9. The tension roller assembly of claim 1, wherein the tension arm connection point comprises a hinge via which the tension arm is connected in a hinging manner to the support arm.

10. The tension roller assembly of claim 1, wherein a maximum extension of the spring during a transition between the engaged state and the disengaged state is determined by a distance over which the rod can slide relative to the support arm until the end stop engages the stop surface.

11. The tension roller assembly of claim 1, wherein a length of the spring in the uncompressed state is between 250 and 300 mm, in particular 280 mm.

12. The tension roller assembly of claim 1, wherein a spring coefficient of the spring is between 20 and 30 N/mm.

13. The tension roller assembly of claim 1, wherein a design length of the spring in the compressed state is between 130 and 150 mm.

14. A belt drive comprising:
   a first driven pulley and a second driven pulley which are provided on a same driving axis;
   a driving pulley;
   a first belt interconnecting the first driven pulley with the driving pulley;
   a second belt interconnecting the second driven pulley with the driving pulley; and a tension roller assembly configured for tensioning the first belt or the second belt, the tension roller assembly comprising:
a tension roller;
a pivotable support arm having a pivot end and a roller end, the support arm comprising a support pivot at the pivot end, the support arm further comprising a tension arm connection point having a rod guide, wherein the tension roller is connected in a rotatable manner to the roller end of the support arm;
a tension arm having a first end and a second end, the tension arm connected at the first end to the tension arm connection point of the support arm, the tension arm comprising a compression spring configured to press the tension roller with force against the first belt or the second belt, the tension arm further comprising a rod, a first spring stop, and a second spring stop mounted on the rod, wherein the compression spring extends between the first spring stop and the second spring stop and is maintained under compression;
a mounting plate;
an overcenter assembly connected to the second end of the tension arm, the overcenter assembly comprising a pivot arm which is connected to the mounting plate via a pivot axis, the pivot arm comprising a free end, the overcenter assembly configured to make a pivoting movement over a pivot trajectory between:
an engaged position which is associated with an engaged state of the tension roller assembly,
a disengaged position which is associated with a disengaged state of the tension roller assembly, and
a center position which is located between the engaged position and the disengaged position; and
a rod adjustment device for adjusting a position of the rod relative to the overcenter assembly,
wherein the rod extends from the overcenter assembly to the support arm and through the rod guide, wherein the rod guide allows the rod to slide relative to the support arm,
wherein the tension arm further comprises an end stop which is mounted to an end of the rod which extends through the rod guide,
wherein the support arm comprises a stop surface on a side adjacent the end stop, the stop surface being configured to engage the end stop, wherein the end stop and the stop surface keep the spring under compression and prevent the spring from reaching its full length during a movement of the overcenter assembly from the center position to the disengaged position,
wherein the tension arm further comprises an intermediate member which is connected at one side thereof to the rod, wherein the intermediate member is connected at an opposite side thereof to the free end of the pivot arm via a hinge, and
wherein the pivot trajectory of the overcenter assembly between the center position and the disengaged position is divided into:
a tensioned section in which the end stop does not engage the stop surface and the spring exerts a force on the overcenter assembly, and
a free-moving section in which the end stop engages the stop surface and the spring does not exert any force on the overcenter assembly, wherein the first belt and the second belt are configured to be used alternately.

15. The belt drive of claim 14, wherein the belt drive is configured to be switched by a user between a low rotational speed and a high rotational speed, and wherein the belt drive provides a higher maximum torque in the low rotational speed than in the high rotational speed.

16. A combine harvester comprising:
a belt;
a tension roller assembly configured for tensioning the belt, the tension roller assembly comprising:
a tension roller;
a pivotable support arm having a pivot end and a roller end, the support arm comprising a support pivot at the pivot end, the support arm further comprising a tension arm connection point having a rod guide, wherein the tension roller is connected in a rotatable manner to the roller end of the support arm;
a tension arm having a first end and a second end, the tension arm connected at the first end to the tension arm connection point of the support arm, the tension arm comprising a compression spring configured to press the tension roller with force against the belt, the tension arm further comprising a rod, a first spring stop, and a second spring stop mounted on the rod, wherein the compression spring extends between the first spring stop and the second spring stop and is maintained under compression;
a mounting plate;
an overcenter assembly connected to the second end of the tension arm, the overcenter assembly comprising a pivot arm which is connected to the mounting plate via a pivot axis, the pivot arm comprising a free end, the overcenter assembly configured to make a pivoting movement over a pivot trajectory between:
an engaged position which is associated with an engaged state of the tension roller assembly, and
a disengaged position which is associated with a disengaged state of the tension roller assembly, and
a center position which is located between the engaged position and the disengaged position;
a rod adjustment device for adjusting a position of the rod relative to the overcenter assembly,
a first driven pulley and a second driven pulley which are provided on a same driving axis;
a driving pulley;
a first belt interconnecting the first driven pulley with the driving pulley; and
a second belt interconnecting the second driven pulley with the driving pulley,
wherein the first belt and the second belt are configured to be used alternately,
wherein the rod which extends from the overcenter assembly to the support arm and through the rod guide, wherein the rod guide allows the rod to slide relative to the support arm,
wherein the tension arm further comprises an end stop which is mounted to an end of the rod which extends through the rod guide,
wherein the support arm comprises a stop surface on a side adjacent the end stop, the stop surface being configured to engage the end stop, wherein the end stop and the stop surface keep the spring under compression and prevent the spring from reaching its full length during a movement of the overcenter assembly from the center position to the disengaged position, wherein the tension arm further comprises an intermediate member which is connected at one side thereof to the rod, wherein the intermediate member is connected at an opposite side thereof to the free end of the pivot arm via a hinge, and wherein the pivot trajectory of the overcenter assembly between the center position and the disengaged position is divided into:
- a tensioned section in which the end stop does not engage the stop surface and the spring exerts a force on the overcenter assembly, and
- a free-moving section in which the end stop engages the stop surface and the spring does not exert any force on the overcenter assembly.

* * * * *